Nov. 16, 1943.  E. W. AUSTIN  2,334,374
IMPLEMENT SUPPORT FOR VEHICLES
Filed July 26, 1940  3 Sheets-Sheet 1
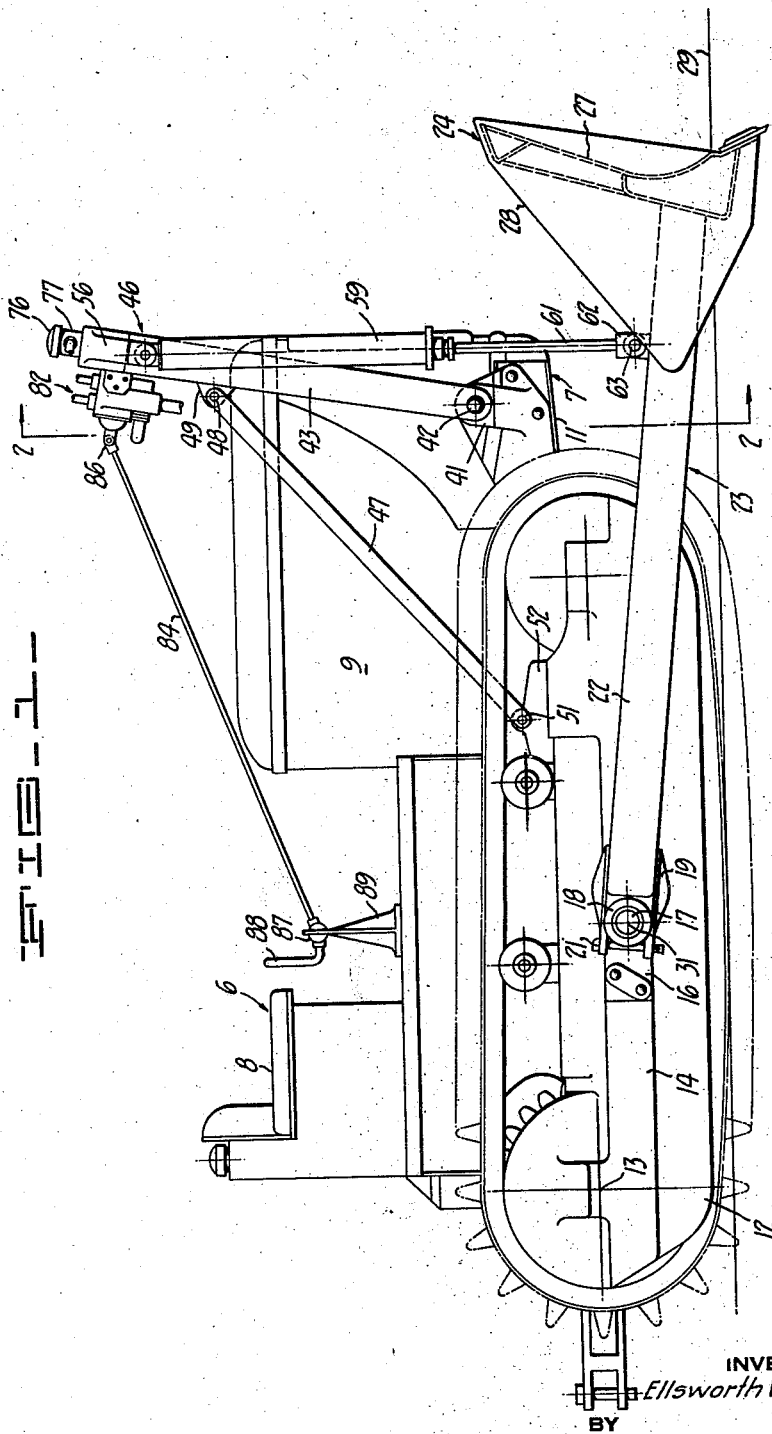
INVENTOR
Ellsworth W. Austin
BY
Marcus Lothrop Nov. 16, 1943.  E. W. AUSTIN  2,334,374
IMPLEMENT SUPPORT FOR VEHICLES
Filed July 26, 1940  3 Sheets-Sheet 2
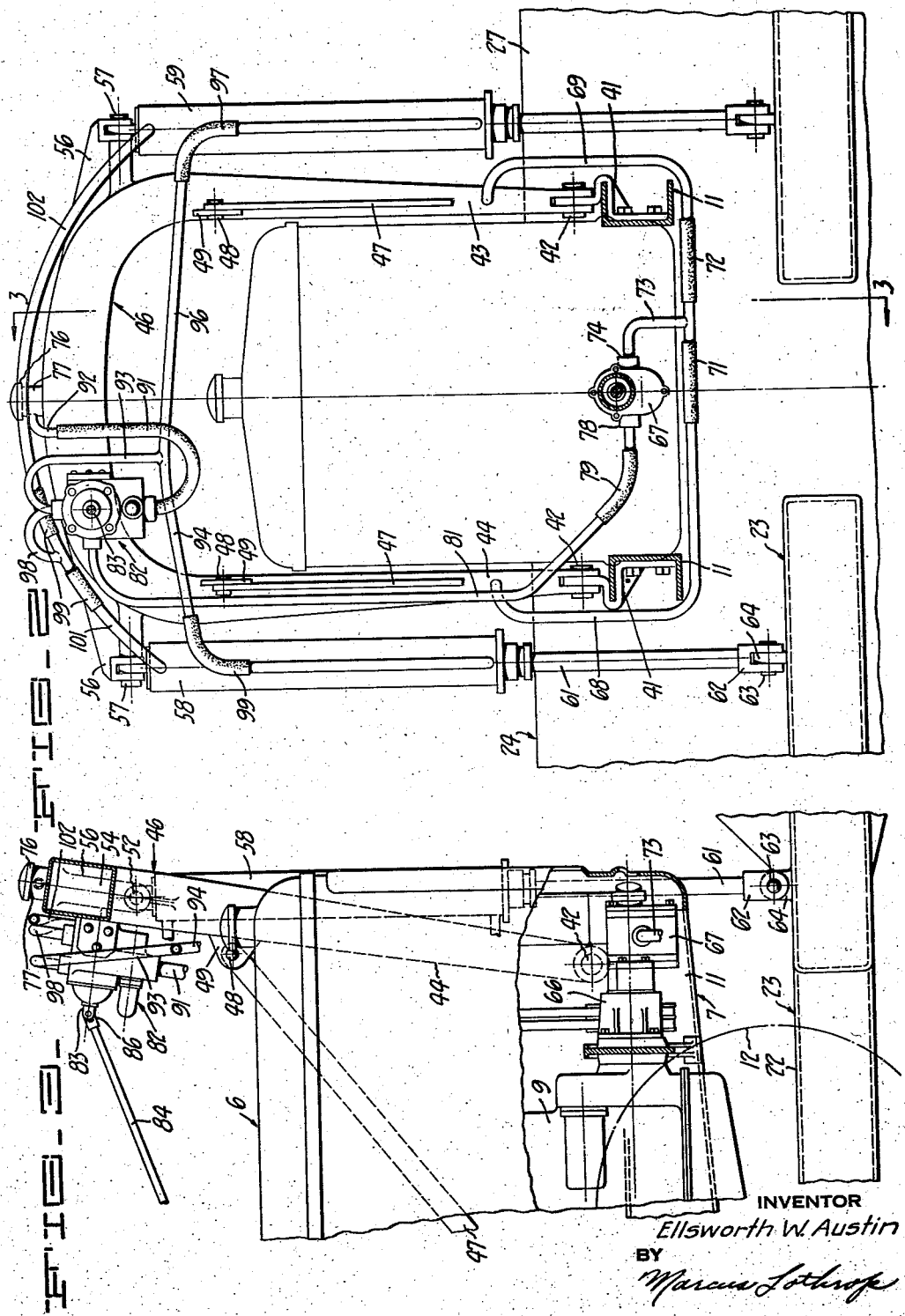
INVENTOR
Ellsworth W. Austin
BY
Marcus Lothrop Nov. 16, 1943.   E. W. AUSTIN   2,334,374
IMPLEMENT SUPPORT FOR VEHICLES
Filed July 26, 1940   3 Sheets-Sheet 3
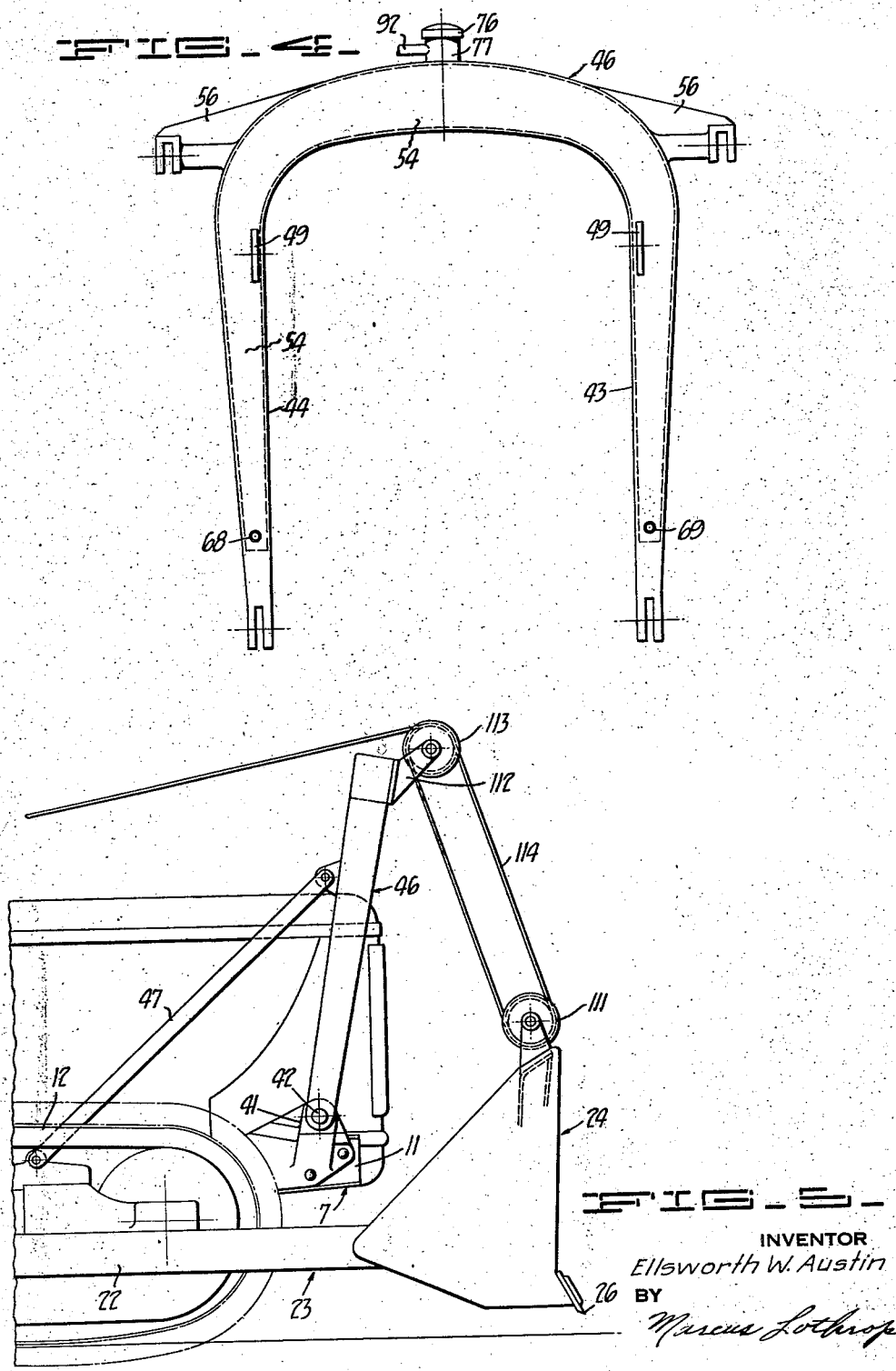
INVENTOR
Ellsworth W. Austin
BY
Marcus Lothrop Patented Nov. 16, 1943

2,334,374

UNITED STATES PATENT OFFICE 2,334,374

IMPLEMENT SUPPORT FOR VEHICLES

Ellsworth W. Austin, Cedar Rapids, Iowa, assignor to La Plant-Choate Manufacturing Company, Incorporated, Cedar Rapids, Iowa, a corporation of Delaware Application July 26, 1940, Serial No. 347,706

6 Claims. (Cl. 37—144)

My invention relates to an implement support, particularly a structure designed to be initially incorporated with or subsequently applied to a vehicle, such as a tractor, for supporting an implement, for example a bulldozer, in operating position with respect to the tractor and under the control of the tractor operator.

It is an object of my invention to provide a generally improved implement support.

Another object of my invention is to provide an implement support which is capable of use either as a hydraulically actuated structure or as a cable-operated structure.

Another object of my invention is to provide an implement support which is readily shipped installed as a plurality of pre-assembled units with very little alteration of the tractor.

A further object of my invention is to provide an implement support of the hydraulically actuated type, in which the hydraulic mechanism is concentrated in one general location on the vehicle.

A further object of my invention is to provide an implement support of the hydraulic type, in which the hydraulic flow paths are arranged for optimum operation.

The foregoing and other objects of the invention are attained in the embodiment illustrated in the drawings, in which Fig. 1 is a side elevation of a tractor equipped with an implement support in accordance with my invention;

Fig. 2 is a cross-section the plane of which is indicated by the line 2—2 of Fig. 1;

Fig. 3 is a cross-section of the support structure, the plane of which is indicated by the line 3—3 of Fig. 2, portions of the tractor being broken away to disclose the interior thereof;

Fig. 4 is an elevation of the arch member; and

Fig. 5 is a side elevation of a modified form of implement support, showing the cable adaptation.

In its preferred form, the implement support of my invention is designed to be applied to a vehicle having a frame, and itself includes an arch member mounted on the frame and constituting a hydraulic tank. Pivotally mounted on the vehicle is a push member adapted to carry an implement and related to the arch member by interposed, hydraulically expansible chambers which are connected in a hydraulic circuit with the tank and are under the control of a suitable valve or like structure operated from a remote point by the vehicle operator.

The structure is adapted for mounting upon vehicles of various different sorts and for use with implements of sundry kinds, but in the present instance it is illustrated as combined with a tractor 6 of a standard kind which includes a main frame 7. The designation "frame" is intended to apply to the entire central body of the tractor, including the operator's station 8, the engine 9 and any incidental structural members 11, such as side rails. The term is intended to be sufficiently comprehensive as to include structures in which the propulsion instrumentalities are mounted on side rails or beams, as well as structures in which the propulsion elements are directly connected together without such rails or beams, since this factor is immaterial with respect to my invention. The main frame 7 is supported from a pair of ground-engaging track members 12 each of which pivots with respect to the main frame about a rear transverse axis 13 and each of which includes frame rails 14. On each of the rails 14 there is mounted a fitting 16 including a projecting mounting pin 17 of a generally cylindrical nature provided with a terminal flange 18 about which is removably clasped a pivot block 19 secured by a removable pin 21. The block 19 is extended by structural shapes 22 included in a generally U-shaped push member 23 which likewise includes an implement 24 at its forward end.

The implement 24 in the present instance is a bulldozer having a cutting blade 26 and a mold board 27 included between the side plates 28, and is adapted to be raised and lowered with respect to the ground line 29 by oscillatory movements of the push member 23 acting about the axis 31 of the pivot pin 17. In practice, it is feasible to locate the axis 31 at a point spaced from but parallel to the axis 13, although differential rising and falling of the tracks 12 introduces some forces tending to absorb looseness or play and possibly imparting some twist to the push member 23. This is usually immaterial but if of importance the axes 31 and 13 can be made to coincide by mounting the member 16 so that the pin 17 and the axis 13 are concentric.

In accordance with my invention, I provide means for operating the push member 23, and this is preferably a hydraulic means. On each of the sides of the main frame 7 I supply and mount brackets 41 which are permanently fixed and which receive pivot pins 42 passing through the lower ends of the depending legs 43 and 44 of an arch member 46. The arch member is an inverted U and straddles the structure of the tractor, preferably in an approximately vertical plane around and above the engine radiator. The position of the arch member is slightly adjustable and is maintained after adjustment in predetermined position by struts 47 each of which is provided with a pin 48 at its forward and upper end piercing an integral ear 49 on the arch member, and is also provided with a pin 51 which connects the lower and rearmost end of the strut with a bracket 52 secured to the main frame 7.

The arch member 46 is preferably constituted of plates and shapes to define a tank having a hollow interior 54 which is finished so as to be oil-tight, so that the arch member serves as a reservoir or tank for the actuating fluid, which customarily is oil.

In addition to serving as an oil tank, the arch member likewise serves as a connection for the structures which operate the push member. At each side the arch member is provided with an extension 56 in which a pivot pin 57 is removably mounted, for pivotally fixing in location the upper end of a hydraulic cylinder 58. A similar cylinder 59 is disposed on the opposite side of the structure, but its mounting and appurtenances are identical and hence are not described in detail. Projecting from the cylinder 58 is a piston rod 61 having affixed thereon a piston (not shown), so that the structure provides a double-acting hydraulically expansible chamber. The lower end of the piston rod 61 is provided with a yoke 62 connected by a pivot pin 63 to an ear 64 upstanding from the push frame 23.

To provide a driving force for expanding and contracting the chambers 58 and 59 under the control of the vehicle operator, I dispose at the forward end of the engine 9 an extension 66 serving as the mounting for a positive displacement type liquid pump 67 connected to the crank shaft (not shown) of the engine and continuously driven thereby. The location of the pump 67 is preferably adjacent the lower end of, and as nearly as possible coplanar with, the reservoir tank 46, and the pump consequently occupies substantially the lowest point in the hydraulic system. Communication between the tank 46 and the pump 67 is established through a pair of outlet pipes 68 and 69, respectively, each of which joins one of the legs 43 and 44 and connects through one of a pair of flexible hoses 71 and 72 with an inlet T 73 to the inlet port 74 of the pump. Since the pump is at substantially the lowest point in the system and immediately below the storage tank, the full hydraulic head of liquid is effective upon the pump intake, so that no difficulty is had with priming and so that entrapped air is entirely free to separate by gravity and to ascend through the legs 43 and 44 of the hydraulic tank to the upper portion thereof from which the air can escape through a filler and breather cap 76 removably mounted on a filler spout 77 connected with the top of the tank 46.

Oil which enters the pump 67 is discharged under pressure from an outlet port 78 and flows through a flexible connector 79 and a pressure pipe 81 extending along the leg 44, to a controller 82 or control valve mounted on the rear of the arch member 46. It is usual practice to mount the controller in very close relationship to the operator's station 8, but I depart from that practice and dispose the controller in immediate juxtaposition with the remainder of the hydraulic circuit, so that piping is kept to a relatively small amount and so that air which may be entrapped in the fluid is free to separate gravitally and eventually escape through the breather cap 76. The controller 82 is substantially a standard valve having a rotatable stem 83 movable into a plurality of positions under the control of the vehicle operator, by means of an extension rod 84 connected at opposite ends by universal joints 86 and 87, not only with the stem 83 but also with an operating handle 88 disposed close to the station 8 and supported by a bracket 89.

Fluid which enters the valve through the pressure pipe 81 can be by-passed through a return hose 91 and a return pipe 92 to the filler spout 77 so that the liquid mixes with the remaining oil in the interior of the tank 54. As one alternative, the oil may be discharged from the valve 82 through a lifting pipe 93 which divides into branches 94 and 96 which are connected through flexible connections 97 to the lower end of the respective hydraulic cylinders 68 and 69, so that the effect of the fluid pressure is to lift the push member 23 with respect to the arch member. Usually, simultaneously connected, but in an opposite pressure sense, is a lowering pipe 98 branched and connected through flexible connections 99 to ducts 101 and 102 connected to the upper end of the cylinders 68 and 69, respectively, so that when pressure fluid is supplied through the lifting pipe 93, low pressure liquid is returned to the tank through the lowering pipe 98. As another alternative, the pressure connections are reversed, and then the effect of the operation is to lower the push member with respect to the arch member. Depending upon the construction of the valve controller 82 in accordance with usual practice, the push member can be maintained in any desired position, can be positively raised and lowered, or can be left free to float or tilt.

The installation of the described structure is relatively simple since the entire arch member, expansible cylinders and controller are mounted together and can be factory assembled and shipped as a unit, and all that the installer must do is to secure the various brackets 11 and 52 in place, usually by bolts through holes provided by the tractor manufacturer, and similarly install the push member by comparably installing the brackets 16. When such installation is effected, the hydraulic structure is located in a compact area, and the hydraulic lines are not necessarily bled to relieve them of air since this bleeding occurs by gravity. Also, the forces transmitted between the push member and the arch member are substantially direct and free from twist components. The added structure does not clutter the space near the operator's station 8, and the operator's vision with respect to forward movement is not materially impaired.

In some instances, the operator of the structure desires to utilize cable operation instead of hydraulic operation, sometimes interchangeably therewith, and for that reason, as shown in Fig. 5, I preferably provide on the implement 24 a plurality of sheaves 111 which can be supplied more or less completely, even with the hydraulic structure, and I likewise provide on the forward face of the arch member 46 a mounting block 112 to which sheaves 113 are adapted to be secured, these latter also being supplied more or less completely along with the hydraulic structure. For cable operation, therefore, it is necessary only temporarily to disable the hydraulic structure and to thread an appropriate cable 114 through the sheaves 111 and 113 and extend it to any suitable operating device which, since it is entirely standard, is not illustrated herein. In the event cable operation is to be utilized exclusively, parts of the hydraulic structure can be dispensed with entirely, the parts being principally the piping and cylinders 58 and 59 as well as the controller 82, yet the remaining parts of the structure form an excellent mounting for the cable sheaves 113.

I claim:

1. An implement support for a vehicle having frame side portions and an upstanding central portion therebetween, comprising a hollow arch member constituting a tank and supported upon said frame side portions and spanning said central portion, a push member mounted upon said vehicle for movement with respect to said arch member, hydraulically expansible chambers mechanically connected to said arch member and to said push member for moving said push member, and means for connecting said chambers in a hydraulic circuit including said tank.

2. An implement support for a vehicle having frame side portions and an upstanding central portion therebetween comprising a hydraulic tank structure disposed above and extending across said central portion, a control valve mounted on said tank and communicating therewith, legs secured to said side portions and included in said tank structure, a push member movably mounted upon said vehicle, hydraulically expansible chambers connected to said tank structure and to said push member for moving said push member and located lower than said valve, and hydraulic interconnections between said chambers and said valve.

3. In a vehicle provided with a frame having a central upwardly extending portion: an arcuate tank straddling said upwardly extending portion and secured to said frame; an implement actuator movably mounted on said frame; hydraulic means operatively disposed between said arcuate tank and said actuator for imparting movement to said actuator and a hydraulic circuit including said tank for actuating said hydraulic means.

4. In a vehicle provided with a frame having a central upwardly extending portion: an arcuate tank secured to said frame and straddling said upwardly extending portion; a push member pivoted to said frame and extending forwardly thereof; hydraulic means operatively disposed between said arcuate tank and said push member for elevating and lowering the forward end of said push member and a hydraulic circuit including said arcuate tank for actuating said hydraulic means.

5. A device as defined in claim 3 wherein a portion of said hydraulic circuit establishes communication between the intake of said hydraulic means and one of the lower parts of said arcuate tank.

6. In a vehicle provided with a frame having a central upwardly extending portion: an arcuate tank straddling said upwardly extending portion and secured to said frame; a push member pivoted to said frame with its free end extending forwardly thereof; a hydraulic expansible chamber operatively disposed between said push member and said arcuate tank for elevating and lowering the forwardly extending end of said push member; and a hydraulic circuit including said arcuate tank for actuating said hydraulically expansible chamber.

ELLSWORTH W. AUSTIN.